United States Patent
Balasubramanian et al.

(10) Patent No.: US 10,768,661 B2
(45) Date of Patent: Sep. 8, 2020

(54) AUTOMATIC ORIENTATION OF A DISPLAY OF A PORTABLE AIRCRAFT CARGO CONTROL AND MONITOR PANEL

(71) Applicant: Goodrich Corporation, Charlotte, NC (US)

(72) Inventors: Rameshkumar Balasubramanian, Karnataka (IN); Venkatesan Muthulingam, Karnataka (IN); Sudhendra Nayak, Bangalore (IN); Naveen Kumar Mallipattana Hiriyannaiah, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 35 days.

(21) Appl. No.: 16/059,358

(22) Filed: Aug. 9, 2018

(65) Prior Publication Data

US 2019/0384356 A1    Dec. 19, 2019

(30) Foreign Application Priority Data

Jun. 13, 2018  (IN) .............................. 201811022168

(51) Int. Cl.
  *G06F 1/16*  (2006.01)
  *B64D 9/00*  (2006.01)
  *G01C 17/10*  (2006.01)

(52) U.S. Cl.
  CPC ............ *G06F 1/1613* (2013.01); *B64D 9/00* (2013.01); *G01C 17/10* (2013.01); *G06F 2200/1614* (2013.01)

(58) Field of Classification Search
  CPC .................................................... G06F 1/1613
  (Continued)

(56) References Cited

U.S. PATENT DOCUMENTS

| 5,186,417 A | 2/1993 | Pritchard |
| 5,716,028 A * | 2/1998 | Evans ...................... B64D 9/00 244/137.1 |

(Continued)

FOREIGN PATENT DOCUMENTS

WO    20017031273 A1    2/2017

OTHER PUBLICATIONS

Extended European Search Report for Application No. 19178527.8-1010; dated Oct. 31, 2019, 10 pages.

*Primary Examiner* — Javid A Amini
(74) *Attorney, Agent, or Firm* — Cantor Colburn LLP (57) ABSTRACT

Embodiments includes a system and method for automatic orientation of a display for a portable electronic device (PED) of an aircraft cargo control and monitor panel. The system includes an attitude heading reference system for detecting a first heading information, a master control panel operably coupled to the attitude heading reference system, and a portable electronic device operably coupled to the master control panel. The PED includes a sensor for detecting a second heading information, a display, and a processor operably coupled to the sensor and the display. The processor is configured to receive the first heading information, receive the second heading information, where the first heading information is different than the second heading information, compare the first heading information and the second information, and modify an orientation of a presentation of the display based at least in part on the comparison.

17 Claims, 9 Drawing Sheets

(58) Field of Classification Search
USPC .................................................. 345/659
See application file for complete search history.

(56) References Cited

U.S. PATENT DOCUMENTS

| | | | | |
|---|---|---|---|---|
| 7,198,227 B2* | 4/2007 | Olin | ........................ | B64D 9/00 |
| | | | | 244/118.1 |
| 7,203,570 B2 | 4/2007 | Karlen | | |
| 9,932,112 B1 | 4/2018 | Harms et al. | | |
| 10,005,564 B1* | 6/2018 | Bhatia | .................... | B64D 45/00 |
| 2003/0179079 A1* | 9/2003 | Huber | ....................... | B64C 1/20 |
| | | | | 340/286.01 |
| 2005/0246132 A1* | 11/2005 | Olin | ......................... | B64C 1/20 |
| | | | | 702/174 |
| 2007/0005199 A1* | 1/2007 | He | ......................... | G01C 23/00 |
| | | | | 701/16 |
| 2008/0167760 A1* | 7/2008 | Scherenberger | ....... | G06Q 10/08 |
| | | | | 701/3 |
| 2009/0105874 A1* | 4/2009 | Tietjen | ..................... | B64D 9/00 |
| | | | | 700/217 |
| 2009/0265050 A1* | 10/2009 | Burpee | ................ | A47B 23/002 |
| | | | | 701/16 |
| 2010/0100225 A1* | 4/2010 | Reed | ....................... | B64D 9/00 |
| | | | | 700/213 |
| 2010/0182340 A1* | 7/2010 | Bachelder | ............ | G02B 27/017 |
| | | | | 345/633 |
| 2010/0213313 A1* | 8/2010 | Reed | ........................ | B64D 9/00 |
| | | | | 244/118.1 |
| 2011/0285704 A1* | 11/2011 | Takeda | ................... | A63F 13/525 |
| | | | | 345/419 |
| 2011/0313564 A1* | 12/2011 | Schnorwangen | ....... | B63B 27/00 |
| | | | | 700/214 |
| 2012/0142415 A1* | 6/2012 | Lindsay | ................ | G06T 19/006 |
| | | | | 463/33 |
| 2013/0158700 A1* | 6/2013 | Scherenberger | ......... | B64D 9/00 |
| | | | | 700/213 |
| 2014/0163775 A1* | 6/2014 | Metzler | ................ | G01C 15/002 |
| | | | | 701/2 |
| 2015/0097864 A1* | 4/2015 | Alaniz | ................... | G06T 19/006 |
| | | | | 345/633 |
| 2015/0241961 A1 | 8/2015 | Morris et al. | | |
| 2016/0095150 A1* | 3/2016 | Howe-Ryberg | ......... | H04W 4/70 |
| | | | | 455/90.3 |
| 2018/0035606 A1* | 2/2018 | Burdoucci | ............ | A01D 34/008 |
| 2018/0081426 A1* | 3/2018 | Rothkopf | ............ | G02B 27/0179 |
| 2018/0111698 A1* | 4/2018 | Podnar | ..................... | B64F 1/368 |
| 2018/0178926 A1* | 6/2018 | Louviot | ................ | B64D 45/00 |
| 2019/0096267 A1* | 3/2019 | Shamasundar | ....... | G08G 5/0013 |
| 2019/0256227 A1* | 8/2019 | Balasubramanian | .. | B64D 9/003 |
| 2019/0263339 A1* | 8/2019 | Lee | ........................ | G01D 21/00 |

* cited by examiner

AUTOMATIC ORIENTATION OF A DISPLAY OF A PORTABLE AIRCRAFT CARGO CONTROL AND MONITOR PANEL

CROSS-REFERENCE TO RELATED APPLICATIONS

This application claims the benefit of Indian Application No. 201811022168 filed Jun. 13, 2018, which is incorporated herein by reference in its entirety

BACKGROUND

The present disclosure relates generally to controls, and more specifically to automatic orientation of a display of a portable aircraft cargo control and monitor panel.

Aircrafts provide an efficient means of transporting goods over large distances in a short amount of time. Equipment used to load and unload cargo in the aircraft can include unit load devices (ULD), power drive units (PDU), and freighter common turntables (FCT) and can be controlled by users with a portable controller. After the ULDs are loaded, an operator who is generally nearby uses the portable controller to steer the cargo to its destination. In addition, system controllers are capable of tracking the loaded cargo and their storage locations throughout transport. In some configurations the available cargo area can be monitored and displayed to a user on the portable controller. However, today there is no efficient and effective way to track the orientation that is displayed on the portable controller. It would be helpful in the industry to have a means for device that is updated or changed with respect to the operator viewing direction in order to prevent user confusion.

BRIEF DESCRIPTION

According to one embodiment, a system for automatic orientation of a display for a portable electronic device (PED) of an aircraft cargo control and monitor panel is provided. The system includes an attitude heading reference system for detecting a first heading information, a master control panel operably coupled to the attitude heading reference system, and a portable electronic device operably coupled to the master control panel. The PED includes a sensor for detecting a second heading information, a display, and a processor operably coupled to the sensor and the display. The processor is configured to receive the first heading information, receive the second heading information, where the first heading information is different than the second heading information, compare the first heading information and the second information, and modify an orientation of a presentation of the display based at least in part on the comparison.

In addition to one or more of the features described above, or as an alternative, further embodiments may include a sensor that is at least one of a magnetometer or a compass type device, wherein at least one of the first heading information or second heading information is based on the sensor.

In addition to one or more of the features described above, or as an alternative, further embodiments may include updating the orientation of the presentation of the display at a configurable interval based on comparing the first heading information and the second heading information.

In addition to one or more of the features described above, or as an alternative, further embodiments may include a first heading information that is based on an orientation of an aircraft and the second heading information is based on an orientation of the PED.

In addition to one or more of the features described above, or as an alternative, further embodiments may include a processor that is further configured to determine the orientation of a presentation of the display based at least in part on limit angles.

In addition to one or more of the features described above, or as an alternative, further embodiments may include limit angles that are configurable limit angles.

In addition to one or more of the features described above, or as an alternative, further embodiments may include automatically switching between landscape mode and portrait mode based at least in part on a physical rotation of the PED.

In addition to one or more of the features described above, or as an alternative, further embodiments may include a display of the PED that has soft controls for controlling power drive units and freighter common turntables, wherein an orientation of the soft controls is automatically determined based at least in part on the comparison and the physical rotation of the PED.

In addition to one or more of the features described above, or as an alternative, further embodiments may include presenting a different number of cargo line replaceable units in the display when in the portrait mode and the landscape mode.

In addition to one or more of the features described above, or as an alternative, further embodiments may include a PED that communicates over a wireless communication channel with a master control panel, and the master control panel that communicates with the aircraft attitude heading reference system over a wired or wireless communication channel.

According to another embodiment, a method for automatic orientation of a display for a portable aircraft cargo control and monitor panel is provided. The method includes receiving first heading information and receiving second heading information, wherein the first heading information is different than the second heading information. The method also includes comparing the first heading information and the second heading information, and modifying an orientation of a presentation of a display based at least in part on the comparison.

In addition to one or more of the features described above, or as an alternative, further embodiments may include measuring, using a sensor, at least one of the first heading information or second heading information, wherein the sensor is at least one of a magnetometer or a compass type device.

In addition to one or more of the features described above, or as an alternative, further embodiments may include updating the orientation of the display at a configurable interval based on comparing the first heading information and the second heading information.

In addition to one or more of the features described above, or as an alternative, further embodiments may include first heading information that is based on an orientation of an aircraft and the second heading information that is based on an orientation of the PED.

In addition to one or more of the features described above, or as an alternative, further embodiments may include a processor of the PED that is further configured to determine the orientation of the presentation of the display based at least in part on configurable limit angles.

In addition to one or more of the features described above, or as an alternative, further embodiments may include automatically switching between landscape mode and portrait mode based at least in part on a physical rotation of the PED.

In addition to one or more of the features described above, or as an alternative, further embodiments may include controlling power drive units and freighter common turntables using soft controls on the display of the PED, wherein an orientation of the soft controls is automatically determined based at least in part on the comparison and the physical rotation of the PED.

In addition to one or more of the features described above, or as an alternative, further embodiments may include presenting a different number of cargo line replaceable units in the display when in the portrait mode and the landscape mode.

In addition to one or more of the features described above, or as an alternative, further embodiments may include a PED that communicates over a wireless communication channel with a master control panel, and the master control panel that communicates with an aircraft attitude heading reference system over a wired or wireless communication channel.

BRIEF DESCRIPTION OF THE DRAWINGS

The following descriptions should not be considered limiting in any way. With reference to the accompanying drawings, like elements are numbered alike.

DETAILED DESCRIPTION

The items to be shipped via aircraft cargo are first loaded onto unit load devices (ULDs). The ULDs are specially configured pallets or specially configured containers that aid an operator in loading large equipment on an aircraft or other storage areas. After a ULD is loaded with cargo items, the ULD is loaded onto the aircraft. Once inside the aircraft, the ULDs are moved in the cargo compartment by power drive units (PDUs) and freighter common turntables (FCTs).

The movement of the ULDs is controlled by an operator using various control panels. The control panels can be fixed to the aircraft. In addition, the cargo system also contains a dedicated display to enable the operator to monitor the status of ULD position and the status of cargo line replaceable units (LRU).

With the proliferation of portable electronic devices (PEDs), such as tablet computing device, mobile phones, etc. into the cockpit/cabin, have revolutionized the aviation industry particularly in the area of crew interface, cargo handling, etc. The flexibility of PEDs enables implementation of control panels and functionalities in the PED as various options where the control panels are implemented as soft controls. The portability of PEDs enables the operator to freely carry the integrated control panel and display in the cargo compartment.

In today's environment, when loading and unloading cargo, for example on an aircraft, the orientation displayed on a PED is not updated/changed with respect to the operator viewing direction and the actual aircraft heading direction. In the event when the orientation of the user and the aircraft are not the same, confusion can arise when trying to control a piece of cargo loading equipment to a particular location in the cargo area. Specifically, the location and the direction of the operator viewing the cargo compartment on the display of the PED can confuse the operator as to which direction the ULD has to be commanded/driven. In addition, the display of portable control and monitor panel in the PED has a fixed set of designs to operate in landscape and/or portrait modes.

One or more embodiments provide for automatically updating an orientation of a display according to orientation information based on the orientation of the cargo area of an aircraft and the orientation information of a device including the display being presented to the user. This technique eliminates the confusion for the operator who is controlling the loading equipment in the cargo area.

The techniques described herein enable the automatic adjustment of the display based on the operator's viewing direction and the orientation of the cargo area without user intervention. This also enables the operator or user to view the same display regardless of the operator's viewing direction. The operator is able to focus on cargo loading/unloading operation as opposed to attempting to reconcile the orientation of the cargo area with reference to the user orientation. There is no additional burden to the operator to obtain the supplemental inputs for modifying the orientation of the display presented to the operator or user. Additionally, there is a reduced risk of avoidable collisions due to confusions caused from the mis-orientation of the cargo monitor display.

Figure 1:
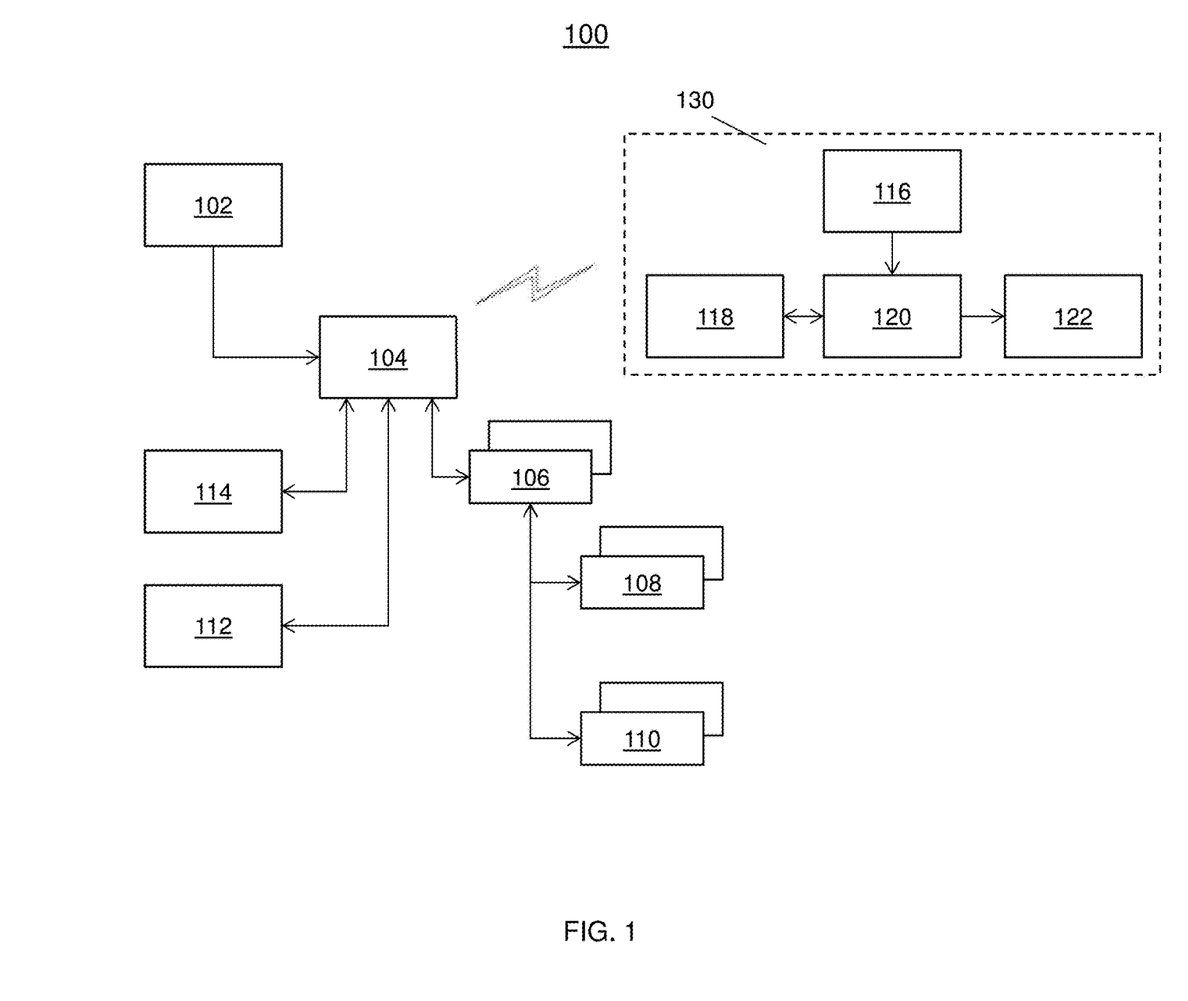
FIG. 1 depicts a system for automatic orientation of a display for a portable electronic device (PED) of an aircraft cargo control and monitor panel in accordance with one or more embodiments.

In FIG. 1 a system for automatic orientation of a display of a PED of an aircraft cargo control and monitor panel in accordance with one or more embodiments is shown.

FIG. 1 includes an aircraft attitude heading reference system (AHRS) 102 which is configured to determine the heading of the aircraft. The heading can be measured by various sensors including magnetometers and compass type devices that can determine a heading with reference to magnetic north. As shown in FIG. 1 the AHRS 102 is coupled to a master control panel 104. In one or more embodiments, the connectivity from the master control panel 104 to the existing AHRS 102 is the avionics data bus such as ARINC 429.

The master control panel 104 operates to control ULDs as they load cargo into an aircraft cargo compartment. Upon entering a particular zone of the cargo compartment, the local control panels 106 can operate to control the ULDs. Local control panels 106 can take over control from the master control panel 104 and are used to control the equipment while in their respective zones or cells in the cargo compartment. In addition, the equipment can include power drive units 108 and freighter common turntables 110 which are coupled to the local control panels to aid in loading and unloading of cargo in the aircraft.

As shown in FIG. 1, the system 100 also includes a cargo maintenance display unit 114 and outside control unit 112 which are located near the cargo compartments to assist operators to load the cargo from the outside of the cargo area.

The master control panel 104 is also configured to communicate with the PED 130. In one or more embodiments, the PEDs 130 are equipped with multiple sensors 116 such as gyrometers, accelerometers, magnetometer, compass, barometer, etc. The software/applications executing in the PEDs 130 use data from these sensors to find the location, orientation, etc. of the PED 130. As shown in the system 100, the PED 130 includes a processor 120 and display 122 for displaying information to a user. The display 122 can be provided to the user in a landscape mode of operation or portrait mode. In the FORWARD and AFT orientation, more LRUs can be displayed in when configured in the portrait mode and less when configured in the landscape mode. Also, the cargo compartment along with the LRUs can be displayed in a vertical fashion. In the RIGHT and LEFT orientation, more LRUs can be displayed when configured in the landscape mode and less when configured in the portrait mode. The cargo compartment along with the LRUs can be displayed in a horizontal fashion. In addition, the display 122 provides soft controls to allow the user to control and command a ULD, or other equipment that is used to load cargo into various sections of the aircraft cargo area. In one or more embodiments, the soft controls are configured to automatically switch their orientation based on the aircraft and PED heading.

Figure 2:
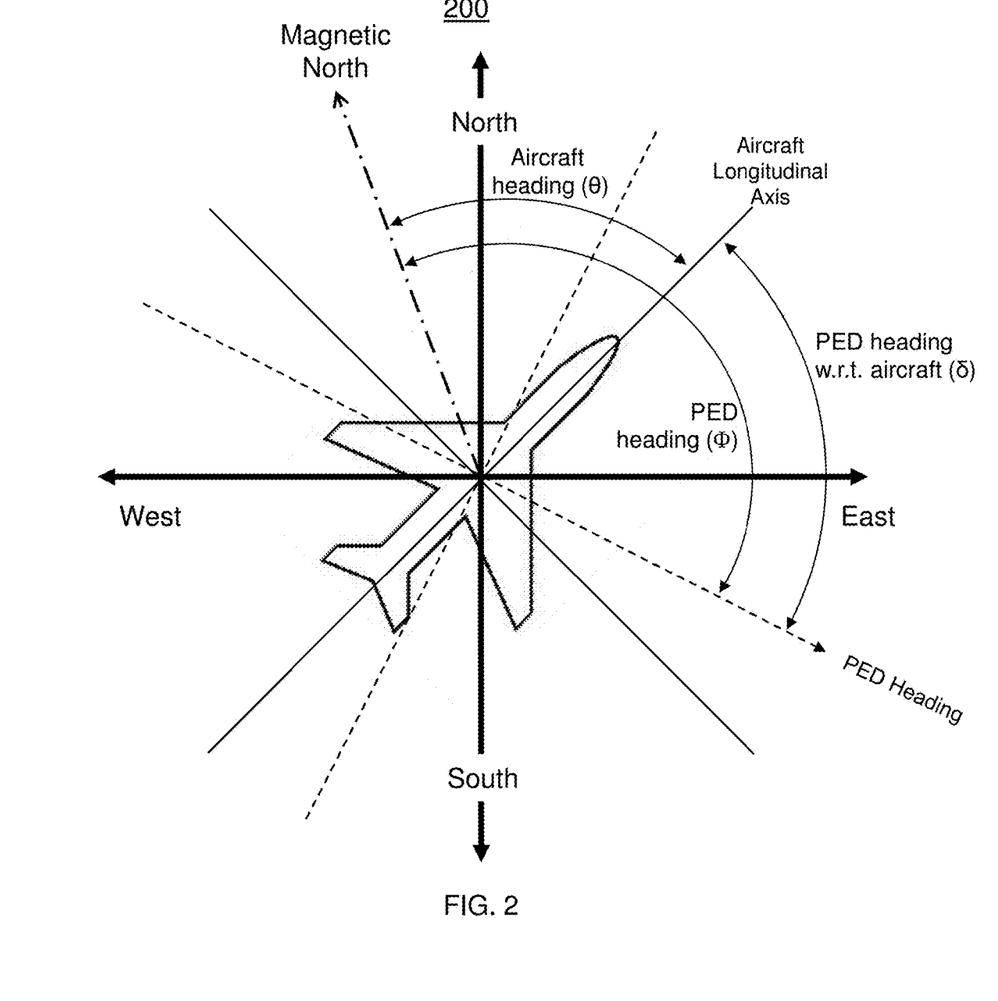
FIG. 2 depicts aircraft and PED headings in accordance with one or more embodiments.

Now referring to FIG. 2, an illustration 200 of aircraft and PED headings in accordance with one or more embodiments is shown. The illustration 200 provides an example where an aircraft heading is not the same as a PED heading where the PED is used to directionally control the loading equipment aboard the aircraft.

Figure 4:
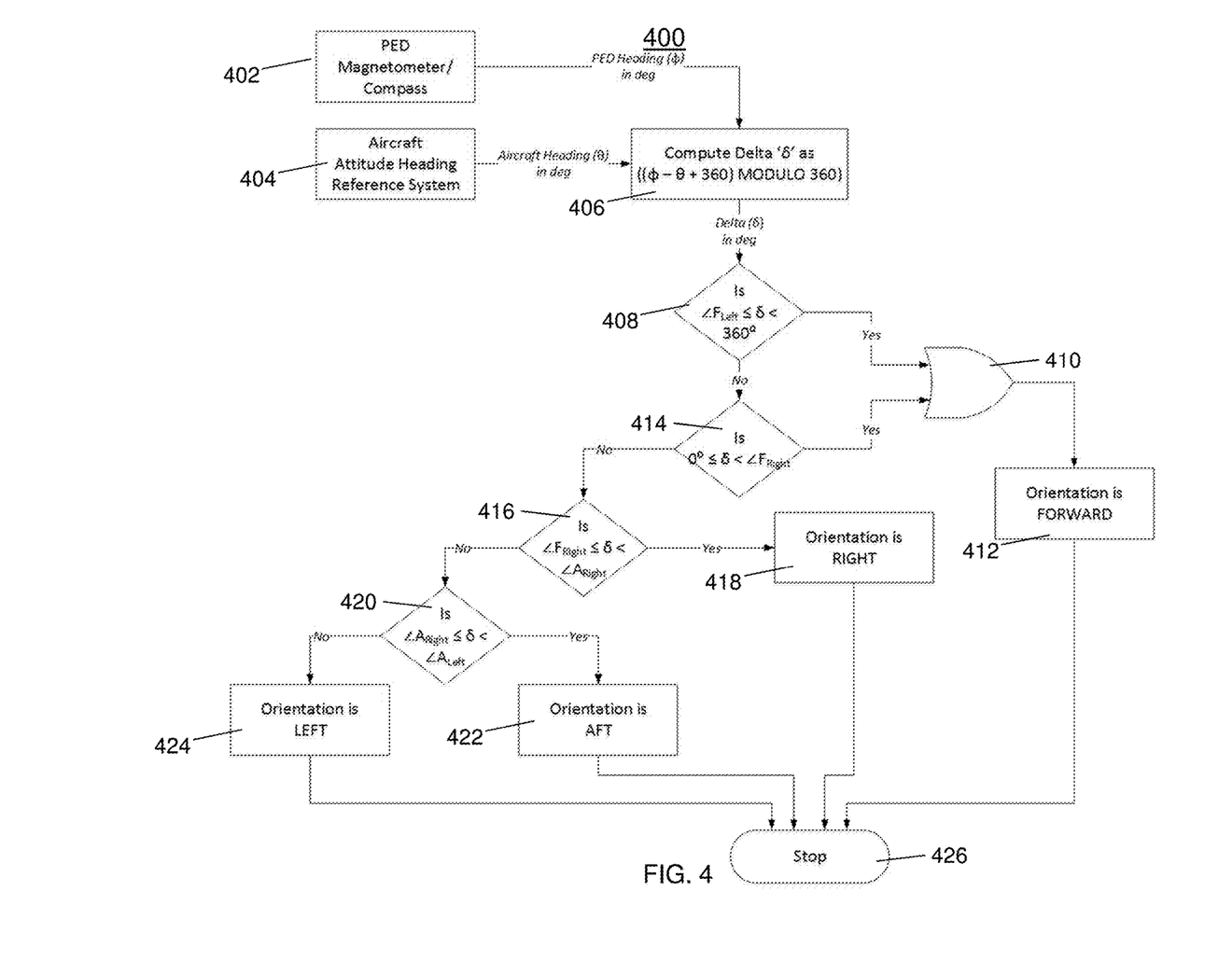
FIG. 4 depicts a flowchart of a method for automatic orientation of a display for a portable aircraft in accordance with one or more embodiments.

As shown in FIG. 2, the aircraft heading (θ) is measured using magnetic north as a reference. In one or more embodiments, the aircraft heading (θ) is measured in the AHRS 102 discussed with reference to FIG. 1. The PED heading (Φ) (represented in by the dashed line) is also measured using magnetic north as a reference point and can be associated with a direction the operator is holding the PED. The PED heading with respect to the aircraft (δ) is measured as the difference between the PED heading (Φ) and aircraft heading (θ). With reference to FIG. 4, delta (δ) is calculated by Equation 1 shown below:

$$\delta = (\Phi - \theta + 360) \text{ Modulo } 360 \quad \text{Eq. 1}$$

where (θ)=Aircraft heading in degrees; (Φ)=PED heading in degrees; (δ)=PED heading with respect to the aircraft in degrees. Equation 1 is used when determining the orientation of the PED with respect to the aircraft as illustrated in FIGS. 5-8 shown below.

Figure 3:
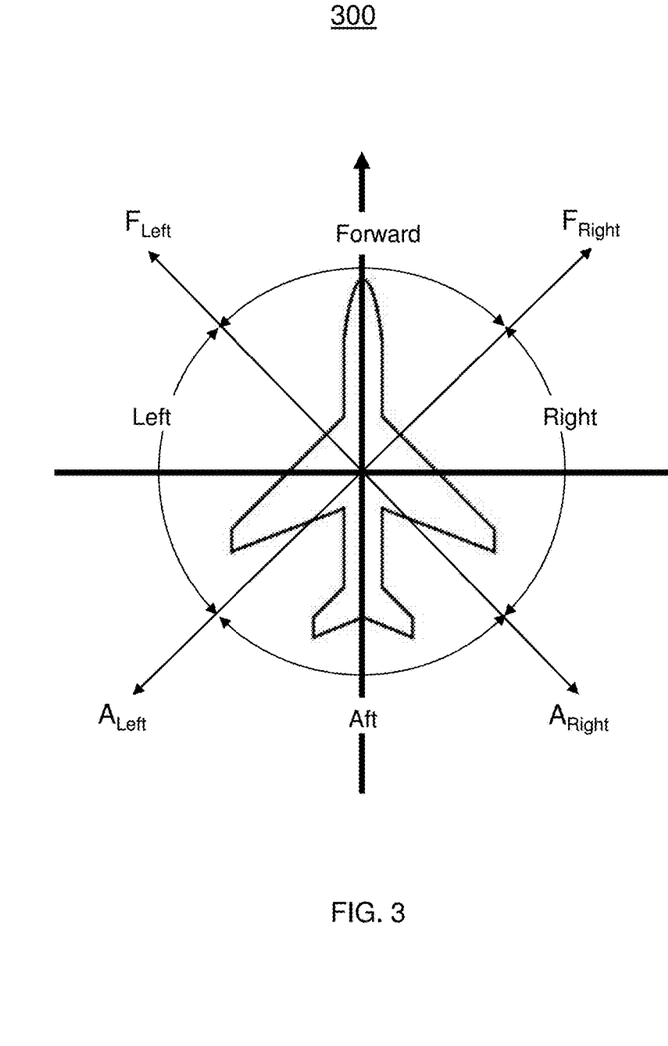
FIG. 3 depicts various PED orientations in accordance with one or more embodiments.

In FIG. 3, an illustration 300 including various PED orientations in accordance with one or more embodiments is shown. The embodiments are configured to set limit angles to determine an orientation of a display to be presented to a user using the PED with reference to the aircraft heading.

As shown in FIG. 3, the orientations include FORWARD, RIGHT, AFT, and LEFT orientations. The orientation is based on limit angles in reference to the aircraft. For example, the limit angles can be set at 45°, 135°, 225°, and 315° to represent the forward right ($\angle F_{Right}$), aft right ($\angle A_{Right}$), aft left ($\angle A_{Left}$) and forward left ($\angle F_{Left}$) regions, respectively. These are the typical orientations that are useful when loading cargo in the aircraft.

Therefore, if the difference (δ) in the aircraft heading and PED heading lies in the various ranges, the orientation will be determined to be in the particular zone. If the difference in headings are in the range defined by $\angle F_{Left} \leq \delta < \angle F_{Right}$, the PED is determined to be in the FORWARD orientation. If the difference is in the range defined by $\angle F_{Right} \leq \delta < \angle A_{Right}$, the PED is shown in the RIGHT orientation. If the difference is in the range defined by $\angle A_{Right} \leq \delta < \angle A_{Left}$, the PED is shown in the AFT orientation. And finally, if the difference is in the range defined by $\angle A_{Left} \leq \delta < \angle F_{Left}$, the PED is shown in the LEFT orientation. It is to be understood that other limit angles can be used based on the needs of each particular application. In addition, the limit angles do not have to be equally configured.

Referring now to FIG. 4, a flowchart of a method 400 for automatic orientation of a display of a portable aircraft cargo control and monitor panel in accordance with one or more embodiments is shown.

The method 400 at block 402 provides measuring the PED heading using a magnetometer/compass. Block 404 provides measuring the aircraft heading via the aircraft attitude heading reference system. After performing the measurements, at block 406, a delta (δ) between the PED heading and the aircraft heading is determined.

The method 400 proceeds to decision block 408 where it is determined whether the delta (δ) lies in a particular range based on the configurable limit angles. In this non-limiting example, there are four regions including the FORWARD, RIGHT, AFT, and LEFT. It should be understood that other regions can be delimited by using more/less limit angles to define the regions. In one or more embodiments, the limit angle is configurable to address the location of various areas such as cargo areas having unique configurations.

At block 408, if it is determined that the delta (δ) is in the region defined by $\angle F_{Left} \leq \delta < 360°$, the orientation is determined to be FORWARD as shown at block 412. If not, the method 400 proceeds to block 414 to determine whether the delta (δ) is in the region defined by $0° \leq \delta < \angle F_{Right}$. If so, the orientation is determined to be FORWARD as shown at block 412. At block 410, if either condition at decision block 408 or block 414 is true (yes), then the orientation is determined to be in the FORWARD orientation. Otherwise, the method 400 proceeds to block 416 to determine if the delta (δ) is in the region defined by $\angle F_{Right} \leq \delta < \angle A_{Right}$. If so, the orientation is determined to be RIGHT as shown in block 418, otherwise the method 400 proceeds to block 420 to determine if the delta (δ) is in the region defined $\angle A_{Right} \leq \delta < \angle A_{Left}$. If so, the orientation is determined to be AFT as shown in block 422. Otherwise, the orientation is determined to be LEFT as shown in block 424. After determining the orientation of the PED with respect to the aircraft heading, the method 400 is completed for the current cycle at block 426. In one or more embodiments, the process can be repeated at configurable intervals to continuously update the orientation of the display presented to the user.

Figure 5:
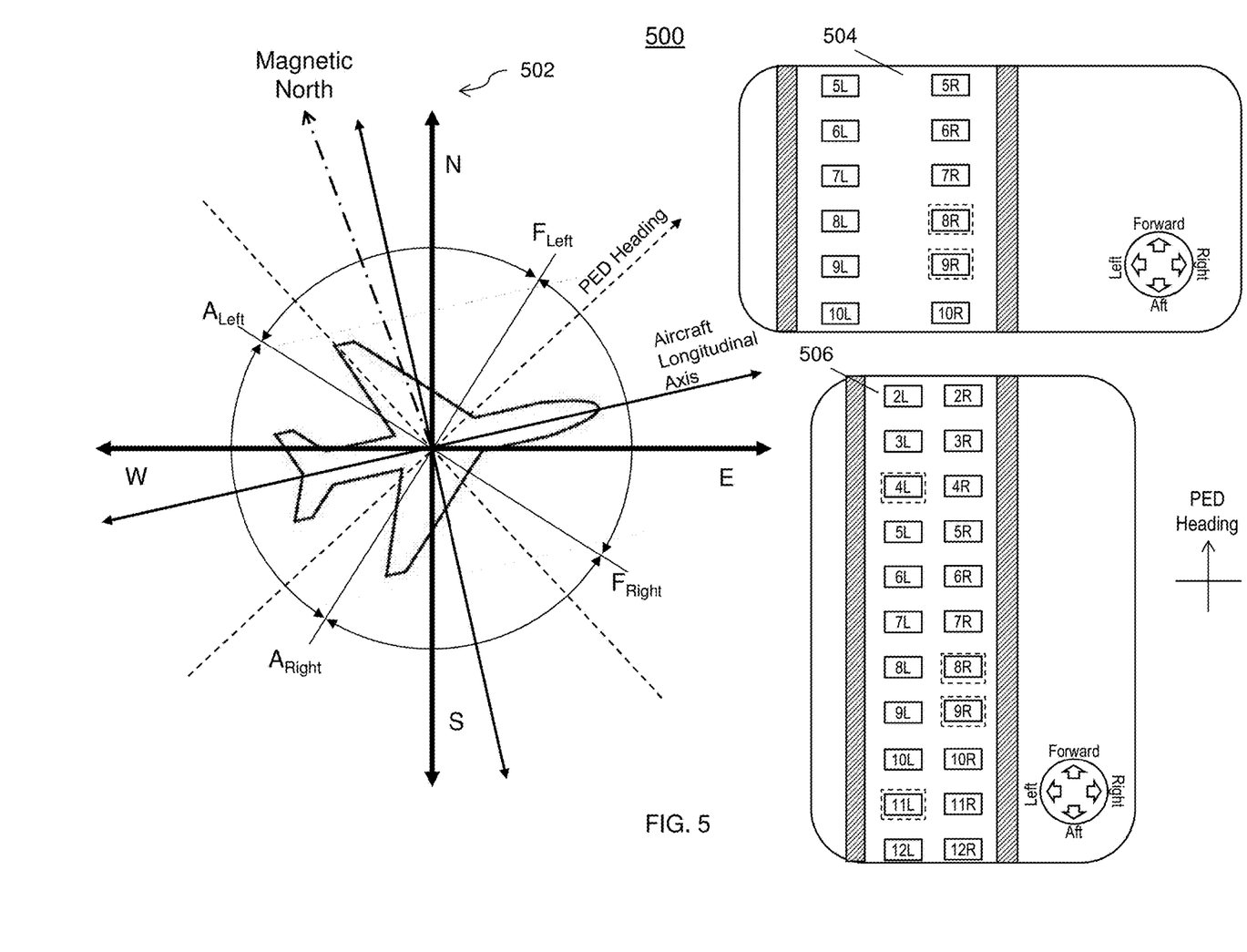
FIG. 5 depicts a PED display having a FORWARD orientation in accordance with one or more embodiments.

FIG. 5 illustrates a FORWARD orientation of the PED with respect to an aircraft heading in accordance with one or more embodiments. FIG. 5 illustrates the display orientation of PED with respect to actual aircraft heading for various PED headings and with limit angles of 90° after performing the method of FIG. 4 described above. FIG. 5 also provides a display having an orientation presented on a PED device in the landscape mode 504 and the portrait mode 506. As shown, the displays include soft controls for controlling devices and/or other equipment. In one or more embodiments, the soft controls displayed on the device are rotated to allow the user to intuitively control the controlled device and/or equipment.

Figure 6:
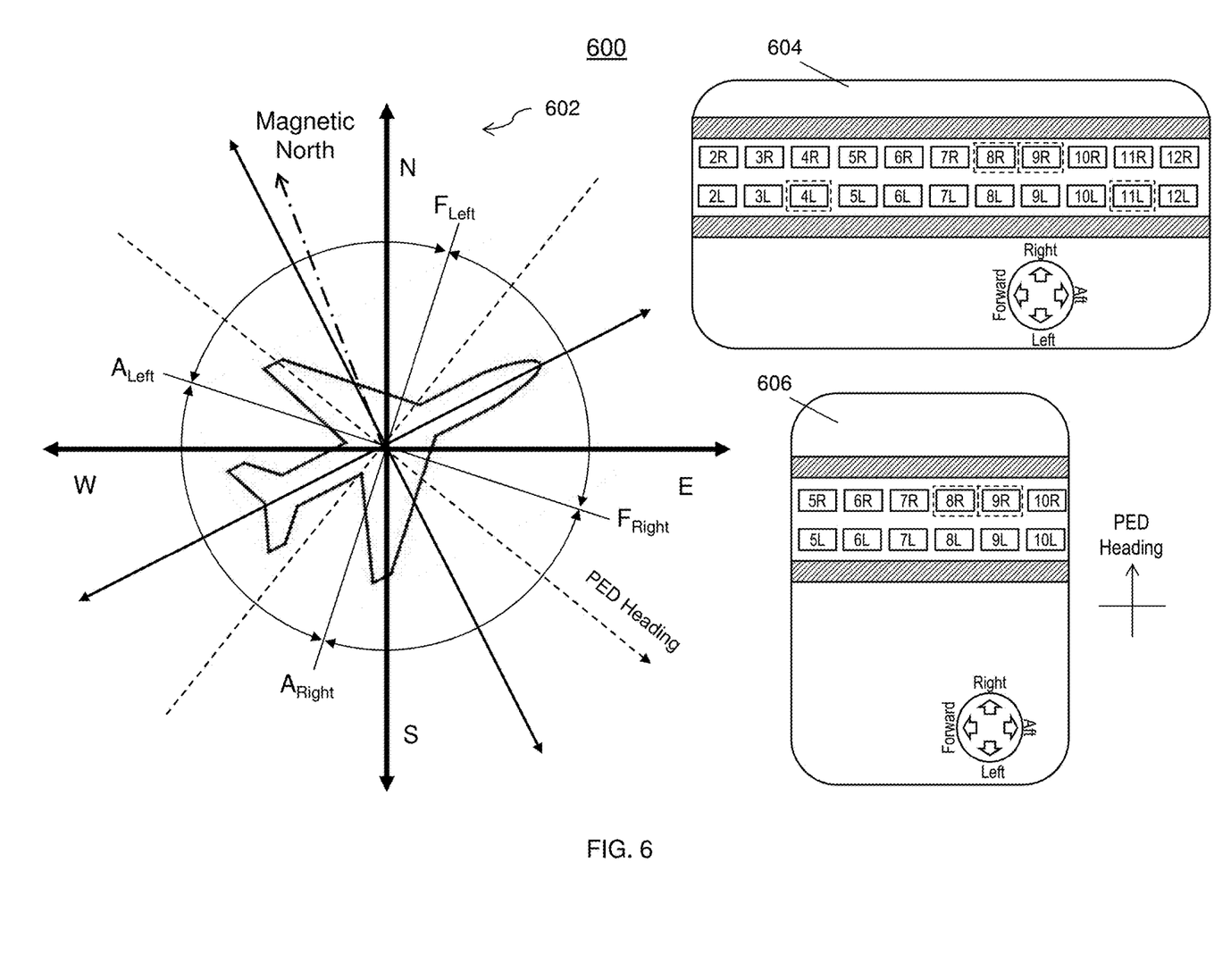
FIG. 6 depicts a PED display having an RIGHT orientation in accordance with one or more embodiments.
Figure 7:
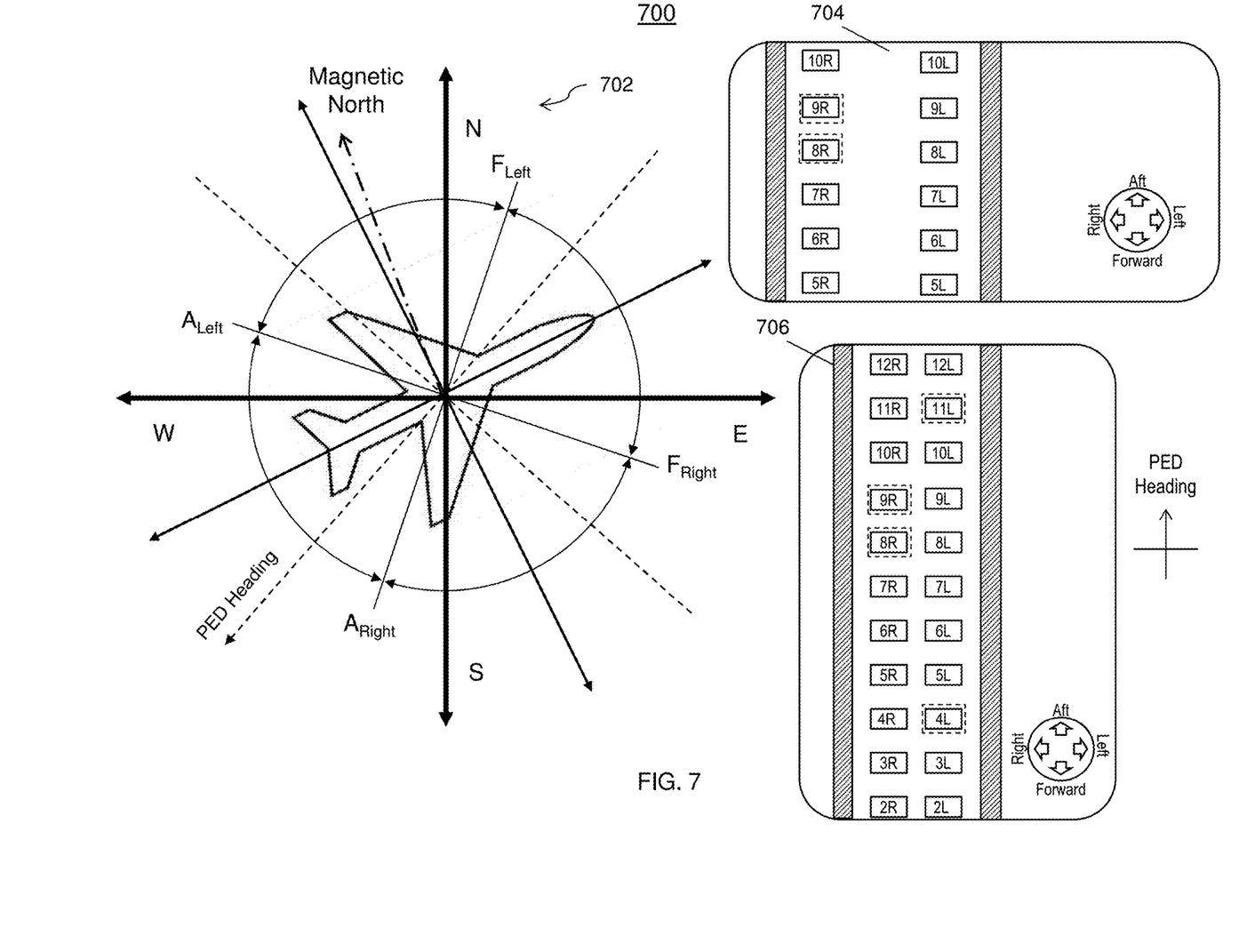
FIG. 7 depicts a PED display having a AFT orientation in accordance with one or more embodiments.
Figure 8:
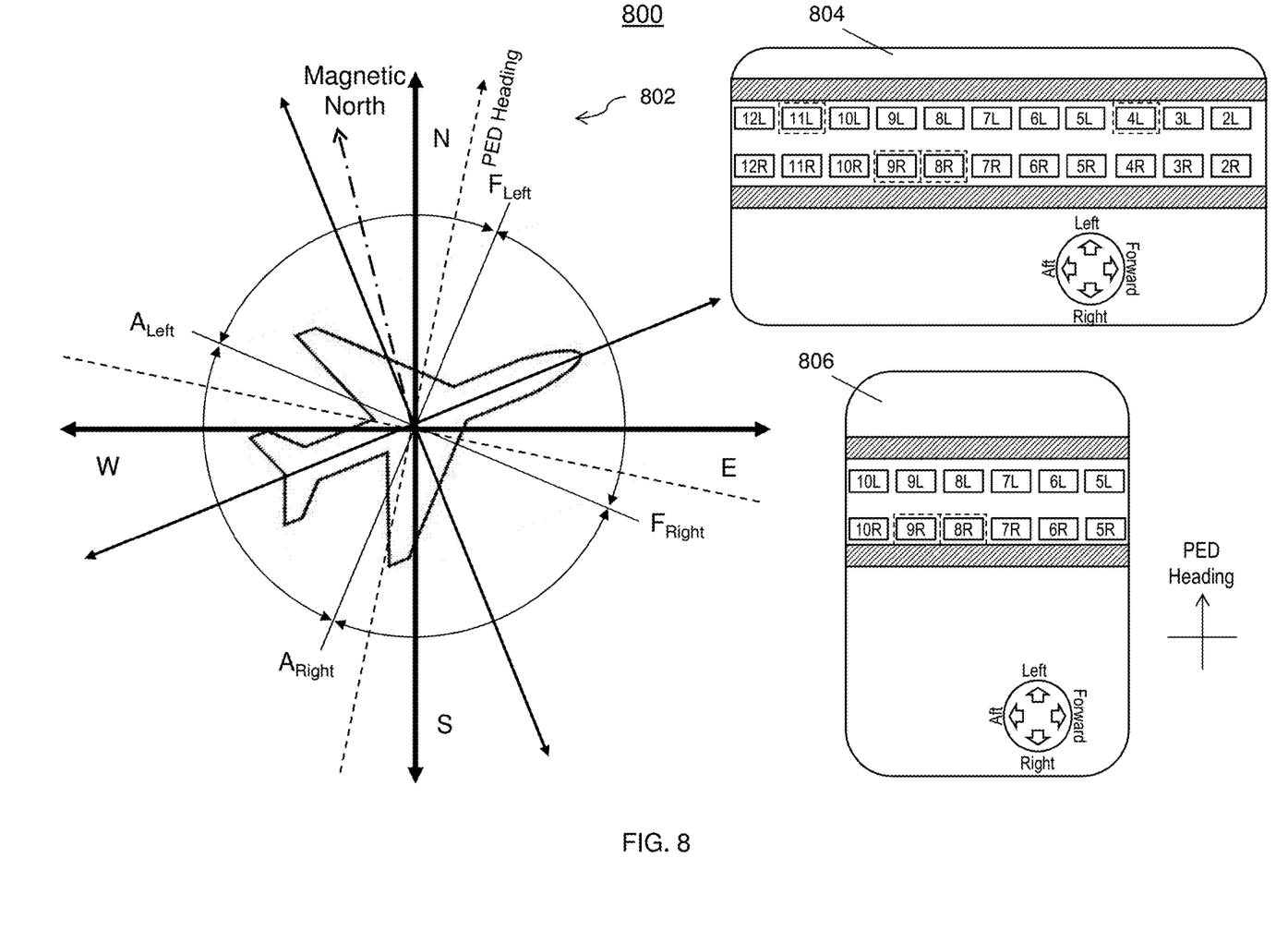
FIG. 8 depicts a PED display having a LEFT orientation in accordance with one or more embodiments.

FIG. 6 illustrates a display orientation of the PED in RIGHT orientation region with respect to the aircraft heading. FIG. 6 also provides a display orientation presented on the PED device in the landscape mode 604 and the portrait mode 606. FIG. 7 illustrates a display orientation of PED in AFT orientation region with respect to the aircraft heading. FIG. 7 also provides a display orientation presented on the PED device in the landscape mode 704 and the portrait mode 706. FIG. 8 illustrates a display orientation of the PED in LEFT orientation region with respect to the aircraft heading. FIG. 8 also provides a display orientation presented on a PED device in the landscape mode 804 and the portrait mode 806.

Figure 9:
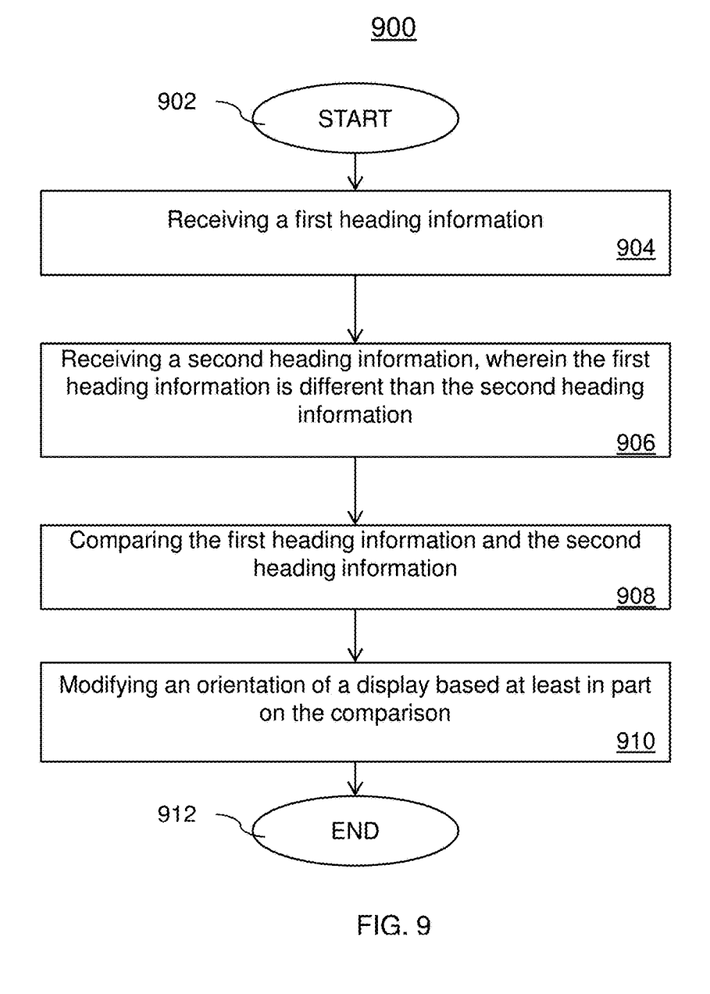
FIG. 9 depicts a flowchart for automatic orientation of a display for a portable aircraft cargo control and monitor panel in accordance with one or more embodiments.

In FIG. 9, a method 900 for auto-orientation of a display of a portable aircraft cargo control and monitor panel in accordance with one or more embodiments is shown. The method 900 begins at block 902 and continues to block 904 which provides for receiving a first heading information. In an embodiment, the first heading information is based on the aircraft orientation from an AHRS.

At block 906, the method 900 provides for receiving a second heading information, wherein the first heading information is different than the second heading information. In one or more embodiments, the first heading information is based on an aircraft orientation from an AHRS and the second heading information is the heading information of a PED. The second heading information is based on at least one of a magnetometer or compass included in the PED.

The method 900 proceeds to block 908 and includes comparing the first heading information and the second heading information. The comparison compares the first heading information and the second heading information by determining the difference of the angles between the first and second headings. Based on the difference, the proper orientation is determined. For example, with reference to FIG. 4, the orientation can be determined to be a FORWARD, or RIGHT, or AFT, or LEFT orientation.

At block 910, the method 900 provides for modifying an orientation of the display based at least in part on the comparison. The determined orientation is used to properly rotate the display and soft controls of the PED to reduce the confusion as to the directional control and orientation perceived by the user without user intervention. The method 900 ends at block 912.

The technical effects and benefits include providing techniques for controlling the auto-orientation of a display of a portable control and monitor panel in a portable electronic device (PED) based on an aircraft heading and operator viewing direction. Embodiments include using a number of limit angles to determine an orientation of the PED and dynamically update its presentation of the display of the device. The limit angles to modify the orientation of the display are configurable and are adaptable to various applications. In addition, the display can be placed in a portrait mode or landscape mode as an added convenience for the customer.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for automatic orientation of a display for a portable electronic device (PED) of an aircraft, the system comprising:
    an attitude heading reference system for detecting a first heading information;
    a master control panel operably coupled to the attitude heading reference system; and
    a portable electronic device operably coupled to the master control panel, wherein the portable electronic device further comprising:
        a sensor for detecting a second heading information;
        a display; and
        a processor operably coupled to the sensor and the display, the processor further configured to:
            receiving the first heading information;
            receiving the second heading information, wherein the first heading information is different than the second heading information;
            comparing the first heading information and the second information; and
            modifying an orientation of a presentation of the display based at least in part on the comparison,
            wherein the display of the PED includes soft controls for controlling power drive units and freighter common turntables, wherein an orientation of the soft controls is automatically determined based at least in part on the comparison and physical rotation of the PED.

2. The system of claim 1, wherein the sensor is at least one of a magnetometer or a compass type device, wherein at least one of the first heading information or second heading information is based on the sensor.

3. The system of claim 1, wherein the orientation of the presentation of the display is updated, at a configurable interval, based on comparing the first heading information and the second heading information.

4. The system of claim 1, wherein the first heading information is based on an orientation of an aircraft and the second heading information is based on an orientation of the PED.

5. The system of claim 1, wherein the processor is further configured to determine the orientation of the presentation of the display based at least in part on limit angles.

6. The system of claim 5, wherein the limit angles are configurable limit angles.

7. The system of claim 1, wherein the PED automatically switches between landscape mode and portrait mode based at least in part on a physical rotation of the PED.

8. The system of claim 7, wherein a different number of cargo line replaceable units are presented in the display when in the portrait mode and the landscape mode.

9. The system of claim 1, wherein the PED communicates over a wireless communication channel with a master control panel, and the master control panel communicates with the aircraft attitude heading reference system over a wired communication channel.

10. A method for automatic orientation of a display for a portable electronic device (PED), the method comprising:
 receiving first heading information;
 receiving second heading information, wherein the first heading information is different than the second heading information;
 comparing the first heading information and the second information;
 modifying an orientation of a presentation of a display based at least in part on the comparison; and
 controlling power drive units and freighter common turntables using soft controls on the display of the PED, wherein an orientation of the soft controls is automatically determined based at least in part on the comparison and the physical rotation of the PED.

11. The method of claim 10, further comprising measuring, using a sensor, at least one of the first heading information or second heading information, wherein the sensor is at least one of a magnetometer or a compass type device.

12. The method of claim 10, wherein the orientation of the display is updated, at a configurable interval, based on comparing the first heading information and the second heading information.

13. The method of claim 10, wherein the first heading information is based on an orientation of an aircraft and the second heading information is based on an orientation of a portable electronic device.

14. The method of claim 10, wherein a processor of the PED is further configured to determine the orientation of the presentation of the display based at least in part on configurable limit angles.

15. The method of claim 10, further comprising automatically switching between landscape mode and portrait mode based at least in part on a physical rotation of the PED.

16. The method of claim 15, further comprising presenting a different number of cargo line replaceable units in the display when in the portrait mode and the landscape mode.

17. The method of claim 10, wherein the PED communicates over a wireless communication channel with a master control panel, and the master control panel communicates with an aircraft attitude heading reference system over a wired communication channel.

* * * * *